United States Patent [19]

Schatteman

[11] 4,256,274
[45] Mar. 17, 1981

[54] TAPE REVERSAL CONTROL

[75] Inventor: Etienne A. M. Schatteman, Wemmel, Belgium

[73] Assignee: Staar S.A., Brussels, Belgium

[21] Appl. No.: 38,477

[22] Filed: May 14, 1979

[30] Foreign Application Priority Data

May 24, 1978 [FR] France .................. 78 15481

[51] Int. Cl.³ .................. G03B 1/04; G11B 15/32
[52] U.S. Cl. .................. 242/201; 242/186; 242/190
[58] Field of Search .................. 242/186–190, 242/201, 191; 360/71, 74.1–74.7

[56] References Cited

U.S. PATENT DOCUMENTS

| 3,488,017 | 1/1970 | Schatteman | 242/191 |
| 4,046,334 | 9/1977 | Kato et al. | 242/201 |
| 4,104,487 | 8/1978 | Jacobson | 360/74.1 |

Primary Examiner—Leonard D. Christian
Attorney, Agent, or Firm—Leydig, Voit, Osann, Mayer & Holt, Ltd.

[57] ABSTRACT

A bi-directional magnetic tape recording and playback apparatus having means for assuring the correct operation of the take-up reel. A solenoid-controlled intermediate gear in the drive train to the reel spindles is moved between two operative positions in order to transfer the magnetic tape from the tape supply reel to the take-up reel whatever the direction of motion of the tape. The apparatus includes a mechanical element associated with the intermediate gear for producing an electrical indication of the intermediate gear being in an operative position. This electrical indication is processed by an electronic circuit for producing an output signal when the positioning of the intermediate gear is incorrect.

9 Claims, 6 Drawing Figures

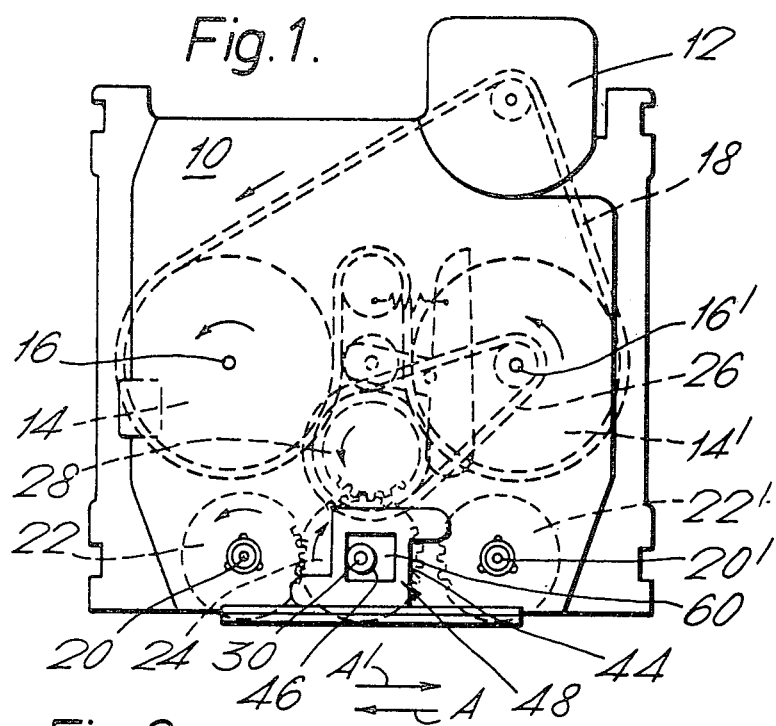
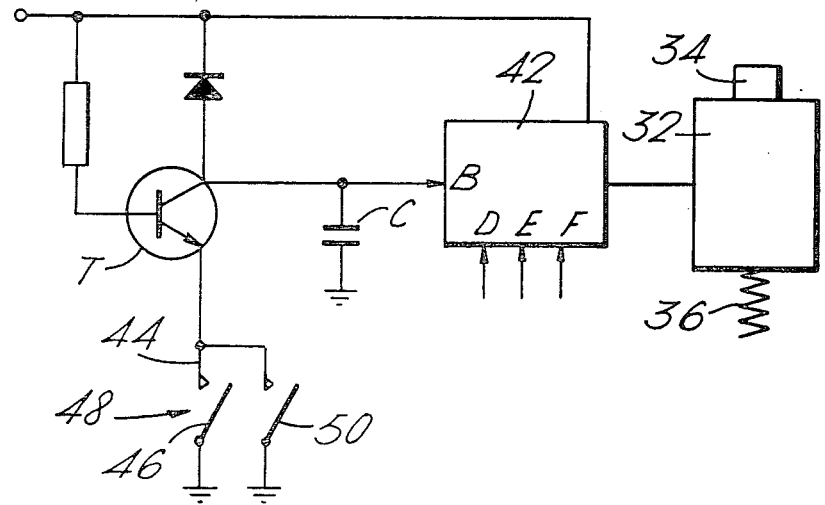

TAPE REVERSAL CONTROL

DESCRIPTION OF THE INVENTION

This invention relates to tape cassette recording and playback apparatus having a drive mechanism providing bi-directional movement of the tape, and particularly to such apparatus in which the magnetic tape is caused to move in either of two directions in the apparatus.

This "bi-directional" type of magnetic tape recording and playback apparatus generally comprises means for reversing the direction of motion of the tape in response to an electrical impulse, said means being associated with driving means, more particularly an active element which can be moved by the reversing means between two operative positions, in order to transfer the magnetic tape from a tape supply reel to a take-up reel, whatever the direction of the motion of the tape.

In an apparatus of this kind, an embodiment of which is described in co-pending U.S. application Ser. No. 906,311 filed May 16, 1978 now U.S. Pat. No. 4,212,438, the active element comprises an intermediate gear driven by the motor and movable between two operative positions in each of which it drives the reel about to become the take-up reel or that which is already the take-up reel, in order to ensure that the magnetic tape will be wound up in the correct manner.

It is desirable in apparatus of this type also to include automatic stopping systems monitoring the rotation of the take-up reel and conveying a pulse to the terminals of the reversing means, which thus reverse the direction of motion of the magnetic tape when the take-up reel ceases to rotate. Since in a bi-directional apparatus either of the reels can be the take-up reel, two automatic stopping systems (one per reel) would apparently be required, rendering the system comparatively expensive.

It has thus been suggested that only one automatic stopping system be operated by the intermediate gear, since it is the stopping of the take-up reel that stops the said gear and thus actuates the reversing device. This solution, however, does not render the system totally safe. The fact is that during a considerable part of the reversal operation, the intermediate gear is not in contact with the reels containing the magnetic tape. Since the intermediate gear is driven by the motor, whether or not it is in contact with the take-up reel, the automatic stopping system no longer is effective.

If for some reason the reversal movement of the intermediate gear is not fully effected, and the intermediate gear fails to actuate the reel which has now become the take-up reel, the magnetic tape will not be wound up, while the unwinding of the tape will be effected by the interaction of the capstan and of the pinch roller, which are operative. The apparatus will thus malfunction, causing tape to be spilled from the take-off reel and not properly wound on the take-up reel, which may break the tape or jam the mechanism, and will remain in this faulty condition because with the intermediate gear rotating the automatic stopping system is ineffective.

It is therefore an object of the present invention to provide a magnetic tape recording and playback apparatus of the bi-directional type, which includes means for reversing the direction of motion of the tape in response to an electrical impulse with a safety circuit to insure that the reversing operation is fully effected before the capstan drive is engaged to transfer tape from reel to reel of a cassette.

Other objects and advantages of the invention will become apparent upon reading the following detailed description and upon reference to the drawings, in which:

FIG. 1 is a schematic plan view of the essential parts of a recording and playback apparatus according to the present invention.

FIG. 2 is an electrical schematic diagram, partially in block form, illustrating a first embodiment of the invention.

Figure 3:
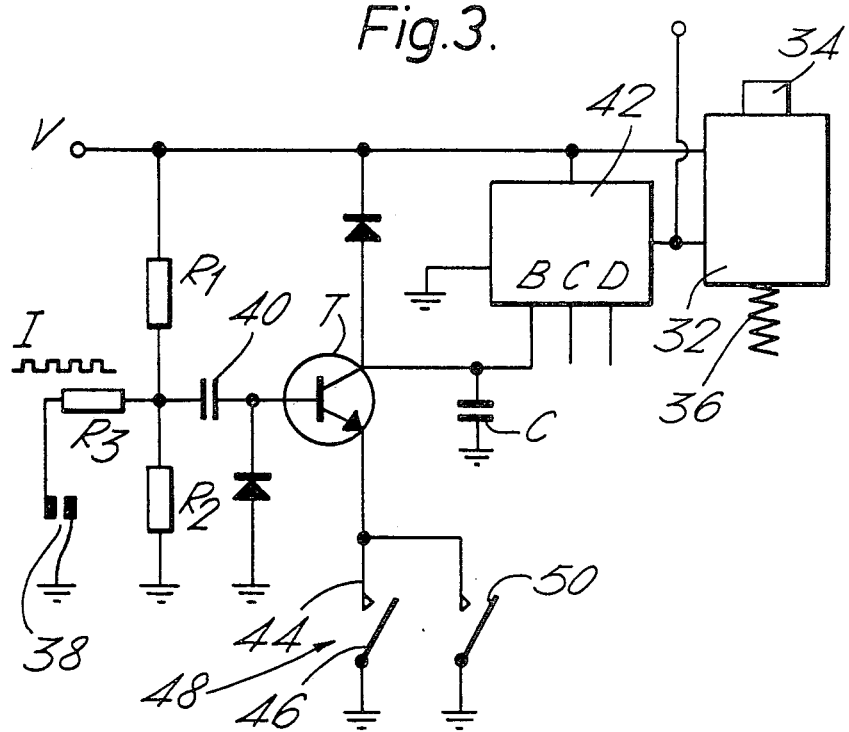
FIG. 3 is an electrical schematic diagram, partially in block diagram form, illustrating a second embodiment of the invention.

While the invention is susceptible to various modifications and alternative forms, specific embodiments thereof have been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention.

In the recording and playback apparatus, marked "10" as a whole in FIG. 1, only those elements are shown which are essential to the present invention. For further details regarding the bi-directional drive of the apparatus, reference may be made to other publications, such as the prior referral to co-pending U.S. application Ser. No. 906,311 now Pat. No. 4,212,438. The apparatus 10 comprises a reversible motor 12 which, by means of a belt 18, drives a pair of flywheels 14, 14', bearing capstans 16, 16' respectively, cooperating with pinch rollers (not shown) for the displacement of the magnetic tape.

The reference numbers 20, 20', identify the driving shafts penetrating the reels of a cassette, not shown. In the version shown these shafts 20, 20', are integral with pinions 22, 22', to enable them to be driven. An intermediate gear or toothed roller 24 is driven with one of the capstans by means of a belt 26 and a pinion 28.

Apart from the angular movement about its shaft 30, the gear 24 can be moved together with its shaft 30 in the direction shown by the arrow A or A', in order to drive either the shaft 20 or the shaft 20', according to the direction of rotation of the gear and thus the direction of movement of the magnetic tape.

When the motor 12 is driving the movable elements in the direction shown by the arrows in FIG. 1, the shaft 20' can rotate freely while the shaft 20 is driven in order to wind the magnetic tape onto the reel which has become the take-up reel. The gear 24 must then occupy the extreme left position shown in FIG. 1 in order to mesh with the pinion 22. On the other hand, when the movement is effected in the direction opposite to that shown by the arrows the intermediate gear 24 has to be moved towards the right as seen in FIG. 1 in order to drive the pinion 22' and its shaft 20'. In other words, the position of the shaft 30 is coordinated with the direction in which the magnetic tape is moving.

The lateral displacement of the gear 24 can be effected in a manner known per se by means of a mechanism comprising a solenoid which is actuated by an impulse and of which the movement of the plunger effects inter alia the displacement of the intermediate gear 24, such a mechanism for lateral displacement of the gear 24 being shown in said co-pending application Ser. No. 906,311.

The circuit in FIG. 2 shows the electrical control of a solenoid of this kind, marked 32. This solenoid 32 is fitted with a plunger core 34 normally held in the rest position by a spring 36. Each time this solenoid is energized by a control pulse produced by a pulse former 42 in response to a reversal signal applied to one of its inputs B, D, E or F, the core 34 is displaced in opposition to the action of the spring 36 and will normally entrain the mechanism for displacing the shaft 30 in the direction shown by the arrow A or A' in FIG. 1 and cause the polarity of the motor to be reversed.

Now it may happen that the mechanical reversal operation is not performed satisfactorily, so that the meshing between the gear 24 and the pinion 22' (or 22) fails to take place, the take-up reel thus not rotating. In accordance with the invention, a switch 48 is provided in series with the emitter of the transistor T. The switch 48 is formed by a mechanical element 44 as shown in FIG. 1 which surrounds an aperture 60 through which passes the shaft 30 of the gear 24. The element 44, which is made of an electrically conductive material, is affixed to the frame of the apparatus but electrically insulated therefrom. The movable contact of the switch 48 is formed by a conductive ring 46 on the shaft 30, which is grounded.

This element 44 is dimensioned to ensure that contact between the shaft 30 and the element 44 will only be made, and thus the switch 48 closed, when the gear 24 is meshing correctly either with the pinion 22 or with the pinion 22', failing which the switch remains open. As long as the switch 48 is closed the transistor T is conductive and the voltage at the terminals of a capacitor C cannot increase. If, on the other hand, the switch 48 remains open, the emitter of the transistor not being grounded, the emitter lead of the said transistor is open and the voltage at the terminals of the capacitor C and at the input B of the pulse former 42 increases and the pulse former causes the solenoid to be actuated. This action on the solenoid will be repeated as long as the emitter of the transistor is not grounded.

Therefore, in the embodiment thus far described, a detector of the position of the intermediate gear 24 in the driving means for the reel which is currently the take-up reel, in the form of an electric switch which is actuated by the displacement of the intermediate gear, is employed to insure that the intermediate roller is correctly positioned in one of its operative positions. The movable contact of the switch is formed by the shaft of the intermediate gear with the other contact of the switch being formed by a conductive element through which the shaft passes and with which the contact is formed only when the shaft of the roller occupies either of its two operative positions.

Figure 4:
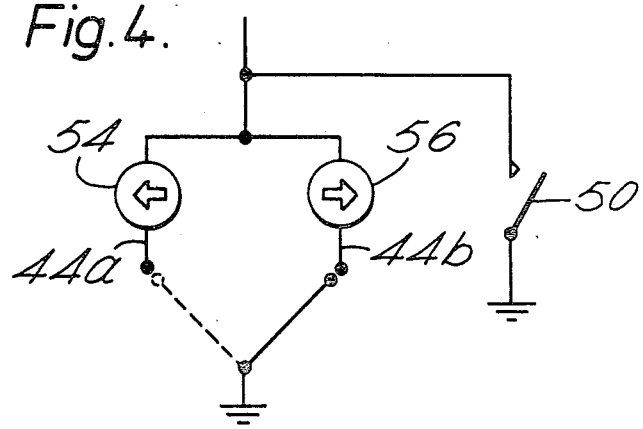
FIG. 4 is an electrical schematic diagram of a switch shown in FIGS. 2 and 3.
Figure 5:
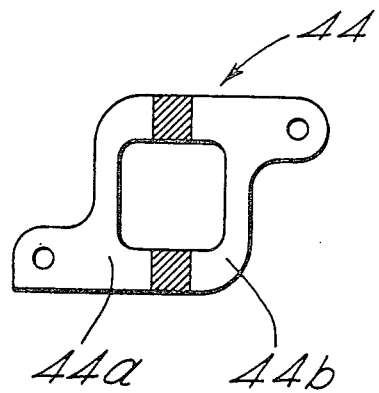
FIG. 5 is an enlarged view of a mechanical element of the switch as shown in FIG. 1.

In another embodiment of the invention the fixed contact of the switch comprises the same element 44 divided into two conductive halves 44a, 44b which are insulated from each other, as shown in FIG. 5, and which are contacted by the shaft of the intermediate gear in the respective two operative positions of the shaft. Each of these portions 44a, 44b of the element 44 serve as a fixed contact of the switch and are associated with a display device 54, 56 as shown in FIG. 4 indicating the direction in which the magnetic tape is being driven.

In either embodiment the signal produced in the event of an incorrect positioning of the intermediate gear is advantageously used for the purpose of exciting the solenoid of the reversing device in order to ensure the correct positioning of the intermediate roller.

In another version of the invention the first impulse supplied by the combination of the transistor T and the capacitor C ejects the cassette, e.g., by releasing an electromagnetic locking system, as proposed in French Pat. No. 1,528,309 and as will be described hereinafter by reference to FIG. 6.

In another embodiment of this invention this ejection is only effected after a certain number of pulses caused by the opening of the switch 48 have appeared, the first impulses being applied, after being converted in the circuit 42, to the solenoid 32, in order to actuate the reversal mechanism. There are then two possibilities, either the correct positioning of the shaft 30 and thus of the gear 24, in which case the impulses cease, or the continuing unsatisfactory position of the gear, in which case the cassette will be ejected, e.g., in the manner described above.

It is preferable to provide in the circuit shown in FIG. 2 a switch 50 designed to short-circuit the switch 48 when the tape is being driven at a high speed. This switch will be automatically closed whenever the fast speed winding or rewinding of the magnetic tape is carried out. The fact is that owing to the high speed of the gear 24 the switch 48 might be caused to open momentarily as a result of vibrations, so that impulses would be conveyed to the device for reversing the direction of motion of the tape. Now the grounding of the emitter of the transistor T via the switch 50 ensures that this will not occur.

The safety circuit of this invention may be advantageously combined with an automatic stopping system, such as that described in U.S. Pat. No. 3,488,017, as illustrated in FIG. 3, which constitutes a further preferred form of the invention.

In the embodiment shown in FIG. 3 a contactor 38 is provided actuated by means such as a cam on the shaft 30 of the intermediate gear 24 (FIG. 1). During the rotation of the shaft 30 the periodic closing of the contactor 38 produces a pulse train I (FIG. 3) and applies via a resistor R3, a voltage divider R1, R2 and a capacitor 40, a periodically varying bias voltage to the base of a transistor T. This transistor T is connected, as may be seen from FIG. 3, to the input B of an amplifier and pulse former 42, in its turn connected to the solenoid 32. The operation of this automatic stopping circuit is analogous to that of the aforementioned U.S. Pat. No. 3,488,017. As long as the shaft 30, is rotating, the transistor T is alternately cut-off and turned on, which keeps the output voltage on capacitor C at a level well below the critical voltage for pulse former 42. When the shaft 30 ceases to rotate, the transistor T is cut-off, and the output voltage in the capacitor C increases which is applied to the input B of the amplifying and pulse forming circuit 42.

In an apparatus of the bi-directional type the signal produced by the cessation of rotation of the shaft 30 is used for the purpose of effecting a reversal of the drive. The pulse former and amplifying circuit 42 produces an impulse which is applied to the solenoid 32, energizing the latter and resulting, via the reversal mechanism, which is not shown, in the lateral displacement of the shaft 30 in the direction from one of its positions to the opposite position, as shown by the arrow A or A', and also in the reverse of the direction of rotation of the motor. If the initial state is that shown in FIG. 1, the various elements will henceforth rotate in the direction opposite to that shown by the arrows amd the gear 24 will mesh with the gear 22', the reel associated with the gear 22' now being the take-up reel. After this reversal the pulse train I will occur again, keeping the output level of the transistor T at a level below that of the supply voltage. The same switches 48 and 50 have been installed as in FIG. 2 and have exactly the same functions as in the latter.

Referring again to FIGS. 4 and 5, these illustrate an advantageous embodiment of the main component 44 of the switch 48. According to FIG. 5, this part 44 consists of two symmetrical branches 44a, 44b, electrically insulated from each other but each connected to the emitter of the transistor T, via pilot lamps and/or via signalling devices 54 and 56 respectively (FIG. 4).

Engagement between the gear 24 and the pinion 22 corresponds to the closing of the switch by the contact 44a, whereas engagement between the gear 24 and the pinion 22' corresponds to the closing of the switch 48 via the contact 44b. The closing of each of these contacts as such causes either the lamp 54 or the lamp 56 to light up, according to the direction of motion of the magnetic tape. These lamps 54 and 56 therefore provide the user with a visible indication of the direction of motion of the tape. They also show, according to whether they are off or on, whether the gear 24 is incorrectly or correctly positioned. The variant illustrated in FIGS. 4 and 5, needless to say, can be used equally well for the circuit shown in FIG. 2 or for that shown in FIG. 3.

It should be noted that the reversal device can be actuated by other means than that shown in FIG. 2, particularly by manual operation or by the aid of a selector device for the desired direction of movement. The signals emitted by these control devices are applied to the circuit at D and E. The safety device to which this invention relates may be used for these devices also.

Figure 6:
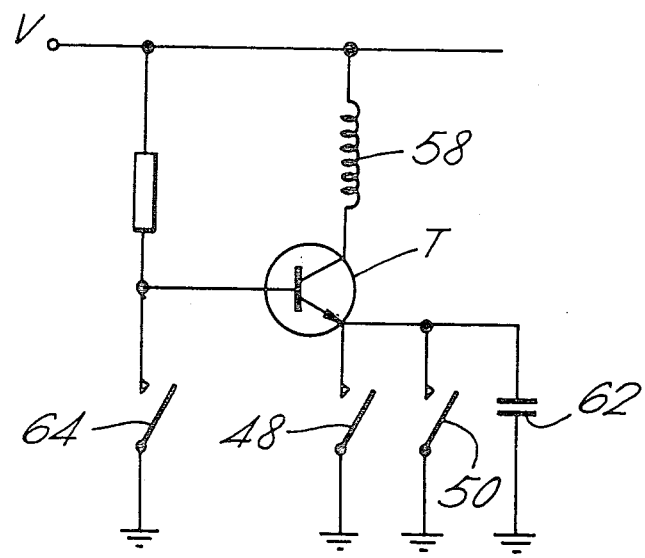
FIG. 6 is a schematic electrical diagram of another embodiment of the circuits of FIGS. 2 and 3.

FIG. 6 shows a further feature which can be employed either with the circuit shown in FIG. 2 or with that shown in FIG. 3, in order to make advantageous use of the signal generated in response to the failure of the switch 48 to close. For a tape deck having a movable cassette supporting frame, a frame locking solenoid having a control winding 58, such as the solenoid described in French Pat. No. 1,528,309, is incorporated in the circuit of the transistor T shown in FIGS. 2 and 3.

In this case, and as may be seen from FIG. 6, the winding 58 of the solenoid, which keeps the cassette and thus the apparatus itself in the operative position, is connected to the collector of the transistor T. When the switch 48 is closed, the driving means being thus correctly positioned, the solenoid 58 is kept actuated and the apparatus remains in the operative position. During the reversal movement the displacement of the intermediate gear between its two operative positions causes the switch 48 to be momentarily opened. In order to ensure that this opening will not systematically cause the cassette to be ejected, a capacitor 62 is provided for the purpose of keeping the cassette in the operative position during the reversal movement. If, however, this reversal for some reason takes place incorrectly, the switch 48 will remain open, and once the capacitor 62 has been completely charged the supply to the solenoid will be interrupted, so that the cassette will be ejected. By the selection of a suitably designed capacitor 62, therefore, a certain response time can be fixed for the ejection of the cassette, particularly in order to ensure that this will take place after a certain predetermined number of reversal impulses have been emitted in response to the prolonged opening of the switch 48. Furthermore, the presence of the circuit in FIG. 6 can be utilized in order to eject the cassette manually by means of a switch 64 enabling the base of the transistor T to be grounded.

What is claimed is:

1. In a magnetic tape recording and playback apparatus of the bi-directional type which includes drive means for moving the tape, and means for reversing the direction of motion of the tape and for deactivating said drive means in response to an electrical impulse, said reversing means being associated with driving means having an active element portion which can be moved by the reversing means between two operative positions for transferring the magnetic tape from a tape supply reel to a take-up reel, whatever the direction of motion of the tape, the improvement comprising:
   a position detector having means for detecting the position of the driving means; and
   electric circuit means coupled to the position detector for producing an output signal subsequent to movement of said active element portion from one of said operative positions to the other operative position for activating said drive means.

2. The improvement of claim 1, wherein said active element portion comprises an intermediate gear, having a shaft, which in each of its operative positions drives a shaft of the take-up reel and wherein the position detector comprises an electric switch having contacts which is actuated by the displacement of the intermediate gear, the contacts of said switch being only closed if the said gear is correctly positioned in each of its operative positions.

3. In a magnetic tape recording and playback apparatus of the bi-directional type which includes means for reversing the direction of motion of the tape in response to an electrical impulse, said reversing means being associated with driving means having an active element portion comprising an intermediate gear, having a shaft, which can be moved by the reversing means between two operative positions, and which in each of its operative positions drives a shaft of a take-up reel for transferring the magnetic tape from a tape supply reel to said take-up reel, whatever the direction of motion of the tape, the improvement comprising:
   a position detector having means for detecting the position of said intermediate gear including an electric switch having contacts which is actuated by the displacement of the intermediate gear, the contacts of said switch being only closed if the said gear is correctly positioned in each of its operative positions; and
   electrical circuit means coupled to the position detector for producing an output signal when the positioning of said intermediate gear is in either one of said operative positions, including a transistor in which the collector is coupled to the reversal means and in which the emitter is coupled to one of the contacts of the switch, the other contact of the switch being grounded.

4. The improvement of claim 3, wherein a movable contact of the switch comprises the shaft of the intermediate gear, the other contact being formed by a conductive element through which the said shaft passes and with which the contact is formed when the shaft of the gear occupies either of its two operative positions, the said shaft of the gear being coupled to ground and the conductive element being coupled to the emitter of the transistor.

5. In a magnetic tape recording and playback apparatus of the bi-directional type which includes means for reversing the direction of motion of the tape in response to an electrical impulse, said reversing means being associated with driving means having an active element portion comprising an intermediate gear, having a shaft, which can be moved by the reversing means between two operative positions, and which in each of its operative positions drives a shaft of a take-up reel for transferring the magnetic tape from a tape supply reel to said take-up reel, whatever the direction of motion of the tape, the improvement comprising:

a position detector having means for detecting the position of said intermediate gear including an electric switch having contacts which are actuated by the displacement of the intermediate gear, the contacts of said switch being only closed if the said gear is correctly positioned in each of its operative positions; and electrical circuit means coupled to the position detector for producing an output signal when the positioning of said intermediate gear is in either one of said operative positions, one of the contacts of said electric switch being movable and comprising the shaft of the intermediate gear, the other contact being formed by a conductive element through which the said shaft passes and with which the contact is formed when the shaft of the gear occupies either of its two operative positions, the said shaft of the gear being coupled to ground and the conductive element being coupled to the emitter of the transistor.

6. The improvement of either of claims 4 or 3, further comprising an auxiliary switch coupled between the emitter of the transistor and ground and operable to be closed automatically and only in the event of a fast winding motion of the tape.

7. The improvement of any of claims 4 or 3, wherein the base of the transistor is coupled to an angular speed pick-up detector associated with the intermediate gear and forming part of an automatic stopping device.

8. The improvement of any of claims 4, 7 or 3, further comprising a cassette locking solenoid coupled in series with the collector of the transistor and a capacitor coupled between the emitter of the transistor and ground, in parallel with the switch.

9. The improvement of either claim 4 or 5, wherein the conductive element comprises two conductive branches which are insulated from each other, one or the other of the branches being contacted by the shaft of the intermediate gear according to which of the two operative positions is occupied by the gear, each of the said two branches being coupled to the emitter of the transistor.

* * * * *